United States Patent Office 3,761,356
Patented Sept. 25, 1973

3,761,356
PROCESS FOR PRODUCING AN ESTERASE
Edward G. Daniels, Portage, Mich., assignor to The
Upjohn Company, Kalamazoo, Mich.
No Drawing. Filed Jan. 10, 1972, Ser. No. 216,815
Int. Cl. C07g 7/02
U.S. Cl. 195—62
4 Claims

ABSTRACT OF THE DISCLOSURE

An esterase enzyme composition comprising the acetone-insoluble matter left on extracting lipids from the marine invertebrate *Plexaura homomalla* (Esper), 1792, useful for transforming esters of prostaglandins and prostaglandin-like materials to their acid forms.

BACKGROUND OF THE INVENTION

This invention relates to an enzymatic process for transforming prostaglandin esters to their acid forms, to a novel esterase enzyme composition used in that process, and to a process for producing said composition.

The prostaglandins are derivatives of prostanoic acid which has the following structure and atom numbering:

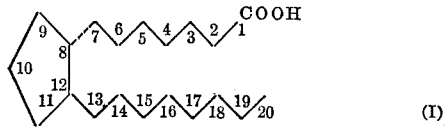

(I)

Prostaglandins are known in the art. See, for example, Bergstrom et al., Pharmacol. Rev. 20, 1 (1968), and references cited therein. For example, prostaglandin $E_1$ ($PGE_1$) has the following structure:

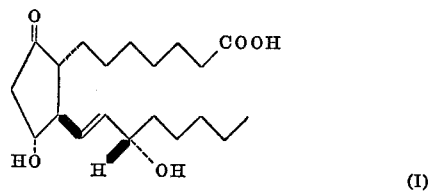

(I)

Other prostaglandins and prostaglandin-like compounds within the scope of this invention are prostaglandin $A_1$ ($PGA_1$), prostaglandin $E_3$ ($PGE_3$), prostaglandin $A_3$ ($PGA_3$), 13,14-dihydro-$PGE_1$, 13,14-dihydro-$PGA_1$, 15-methyl (or ethyl)-$PGE_1$, -$PGA_1$, -$PGE_2$, -$PGA_2$, -$PGE_3$, and -$PGA_3$, 13,14-dihydro-15-methyl (or ethyl)-$PGE_1$, 13, 14-dihydro-15-methyl (or ethyl)-$PGA_1$, their 15$\beta$-epimers, and their racemates. These compounds and their methyl or ethyl esters are known in the art or are available by methods known in the art. See, for example, Bergstrom et al., cited above, Pike et al., J. Org. Chem. 34, 3552 (1969); Schneider et al., J. Am. Chem. Soc. 91, 5372 (1969); Axen et al., Chem. Comm. 1970, 602; Bundy et al., Annals N.Y. Acad. Sci. 180, 76–90 (1971); U.S. Pats. 3,069,322 and 3,598,858; British Pats. 1,040,544, 1,097,533, and 1,202,010; and West Germany Offenlegungsschrift No. P 21 21 980.7.

The prostaglandins are extremely potent in causing various biological responses and accordingly are useful for pharmacological purposes. See, for example, Bergstrom et al., and other references cited above. Other prostaglandin-like compounds produced in their acid form by this invention are each useful for at least one of the pharmacological purposes indicated for the prostaglandins, and are used for those purposes in the same manner as the prostaglandins.

The prostaglandins are obtained in a particular optically active form from certain mammalian tissues, for example, sheep vesicular glands, swine lung, and human seminal plasma, or by reduction or dehydration of a prostaglandin so obtained. See, for example, Bergstrom et al., cited above, and Nugteren et al., Nature 212, 38 (1966). For convenience hereinafter, use of the terms "$PGE_1$," "$PGA_1$," and the like, will mean the optically active form of that prostaglandin or prostaglandin-like material with the same absolute configuration as $PGE_1$ obtained from mammalian tissues. Included within the scope of this invention are also the corresponding racemic forms, consisting of the optically active compounds of natural configuration and their enantiomorphs. When reference to the racemic form is intended, either the word "racemic" or the prefix "*dl*" will precede the prostaglandin name, as for example "*dl*-$PGE_1$." Following the usual conventions, the hydroxy at C–15 is shown in alpha configuration, as in FIG. II, by broken line attachment. Compounds with epi (R) configuartion for the hydroxy at C–15 are so designated by using "15-beta" in the name. Thus, the 15$\beta$-epimer of $PGE_1$ is named "15$\beta$-$PGE_1$." The corresponding 15$\beta$-epimers are likewise within the scope of this invention.

SUMMARY OF THE INVENTION

It is a purpose of this invention to provide a means of transforming prostaglandin esters to their acid forms. It is further purpose to provide a novel esterase enzyme composition useful for that purpose. It is still a further purpose to provide a process for preparing said composition.

Utilization of the prostaglandins and prostaglandin-like materials often requires that they be available in free acid form. They can then be transformed into other desired forms for effective administration, for example salts or esters. However, the prostaglandins and prostaglandin-like materials are not always available in their acid form: when synthesized, they sometimes are obtained as methyl or ethyl esters; in some instances the products are stored as methyl or ethyl esters for stability reasons; and in still other instances these esters may be produced because they provide a preferred form for purification, as by silica gel chromatography. The present invention provides a means of transforming such esters to their acid form in high yield without degradation as an improvement over conventional chemical methods.

I have found an esterase enzyme composition suitable for this purpose. This composition is obtained by processing the marine invertebrate, *Plexaura homomalla*. *Plexaura homomalla* is a member of the subclass Octocorallia, order Gorgonacea, suborder Holaxonia, family Plexauridae, genus Plexaure. See, for example, Bayer, "The Shallow-Water Octocorallia of the West Indian Region," Martinus Nijhoff, The Hague (1961). Colonies of these *Plexaura homomalla* are abundant on the ocean reefs in the zone from the low-tide line to about 25 fathoms in the tropical and subtropical regions of the western part of the Atlantic Ocean, from Bermuda to the reefs of Brazil, including the eastern shore reefs of Florida, the Caribbean island and mainland reefs, and the Gulf of Mexico island and mainland reefs. These colonies are bush-like or small tree-like in habit and are readily identified for collection as *Plexaura homomalla* (Esper), 1792, by those of ordinary skill in this art. Two forms exist, the "R" form and the "S" form. The "R" form is a source of 15$\beta$ (R) prostaglandins such as 15$\beta$-$PGA_2$. See, for example, Weinheimer et al., Tetrahedron Letters, No. 59, 5185 (1969), and H. W. Youngken, Jr. (ed.), "Food-Drugs from the Sea." Proc. Marine Technology Society, pp. 311–314 (1969). The "S" Form is a source of S-configuration prostaglandins, such as $PGA_2$. One method of distinguishing the two forms is described below in Prepartion 1. For the purposes of this invention either form R or form S is useful.

The esterase enzyme composition is produced by the steps:

(1) extracting colonies or colony pieces of the marine invertebrate *Plexaura homomalla* (Esper), 1792, forma R or forma S, with liquid acetone for a sufficient time to remove substantially all soluble lipids, and
(2) recovering the acetone-insoluble matter as said composition.

The colonies of *Plexaura homomalla* are used either in their as-harvested form or in broken or chopped pieces. It is immaterial whether they are used fresh from their natural environment, or after freezing and thawing, or even after drying under ambient conditions.

The extraction with acetone may be done batch-wise, as by stirring in a container, or by percolation, or by continuous methods of extraction known in the art. If stirring is used, it is advantageous to first chop the *Plexaura homomalla* into small pieces, for example less than 3 mm. in greatest dimension. The product is accordingly then a powder consisting of pieces smaller than 3 mm. Contact with acetone is continued until substantially all of the soluble lipids are removed. Normally one hour is sufficient, although a longer time is required for whole colonies and a shorter time is sufficient for chopped colonies with efficient extraction. The end-point can be determined simply by examination of the acetone, as by evaporation and by physical measurements on any residue thus obtained. The extraction temperature is kept below 50° C. to avoid denaturation of the enzyme, and is preferably in the range 20° to 30° C. Lower temperatures may be used but the extraction then proceeds more slowly. The extraction is generally done at atmospheric pressure, but it may be carried out at higher or lower pressures provided the acetone is in a liquid state when contacting the *Plexaura homomalla*.

Other lipophilic liquids may be used, although generally less effectively than acetone: for example, methanol, methanol-chloroform, dichloromethane, or ethanol-ether.

The acetone-insoluble enzyme composition is recovered from the acetone by decantation, filtration, centifugation, or other convenient method for separating solids and liquids. A small amount of adherent actone, for example 10% of the weight of the composition, may be left on the product but it is preferred that the amount be lowered to less than 1%, for example by drying under ambient conditions or under reduced pressure. The product can then be stored without deterioration, preferably at about −20° C. The enzyme composition is useful for hydrolyzing esters, as disclosed below.

If desired, an active esterase enzyme can be isolated from the above composition by solubilizing it with an aqueous detergent solution, separating the solution from the skeleton and spicule matter of the invertebrate, and reprecipitating the enzyme esterase as a powder with acetone.

An advantage of the enzyme composition of this invention is that the enzyme is immobilized. The composition is readily recovered from the hydrolysis mixture, for example by filtration, and, after suitable washing and drying, is available for reuse numerous times.

In utilizing the above esterase enzyme composition for the purposes of this invention, the prostaglandin ester is contacted with a mixture of the enzyme composition and water. The ester is conveniently added as a solution, for example in ethanol or benzene, to about 50–100 times its weight of water. The enzyme composition is added in an amount about 1–15 times the weight of ester. The mixture is stirred until the ester is hydrolyzed, generally about 18–24 hours at 25° C. Temperatures of about 0°–50° C. may be employed, although about 25° C. is preferred. The progress of hydrolysis is readily followed by analysis, for example by thin-layer chromatography by methods known in the art. See, for example, Hamberg et al., J. Biol. Chem. 241, 257 (1966). Finally, several volumes of acetone are added and the soluble acid products are recovered by filtration, concentration, and extraction using methods known in the art.

Accordingly, there is provided a process for producing an optically active acid of the formula

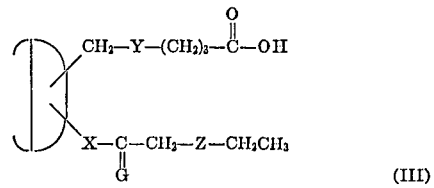

or a racemic acid of that formula and the mirror image thereof, wherein

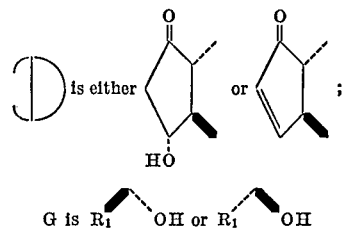

wherein $R_1$ is hydrogen, methyl, or ethyl; wherein (a) X is trans—CH=CH— or —CH$_2$CH$_2$—, and Y and Z are both —CH$_2$CH$_2$—, (b) X is trans—CH=CH—, Y is cis—CH=CH—, and Z is —CH$_2$CH$_2$— when $R_1$ is not hydrogen; or (c) X is trans—CH=CH—, Y is cis—CH=CH—, and Z is cis—CH=CH—; which comprises the steps: (1) contacting an optically active compound of the formula

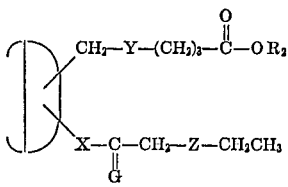

or a racemic compound of that formula and the mirror image thereof, wherein $R_2$ is methyl or ethyl, and wherein

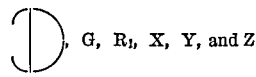, G, $R_1$, X, Y, and Z are as defined above, with water and an esterase enzyme composition produced as described herein, and (2) separating said acid.

Formula III, which is written in generic form for convenience, represents PGE-type compounds when

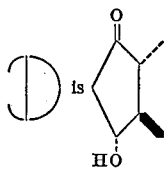

and PGA-type compounds when

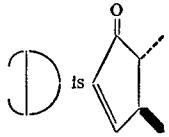

Formula III represents PG$_1$-type compounds when X is trans—CH=CH—, Y is —CH$_2$CH$_2$—, and Z is —CH$_2$CH$_2$—; PG$_2$-type compounds when X is trans—CH=CH—, Y is cis—CH=CH—, and Z is —CH$_2$CH$_2$—; PG$_3$-type compounds when X is trans—CH=CH—, Y is cis—CH=CH— and Z is cis—CH=CH—; and 13,14-dihydro-PG$_1$-type compounds when X, Y, and Z are —CH$_2$CH$_2$—.

DESCRIPTION OF THE PREFERRED EMBODIMENTS

The invention can be more fully understood by the following preparation and examples.

All temperatures are in degrees centigrade.

Preparation 1

To distinguish *Plexaura homomalla* (Esper), 1792, forma R from *Plexaura homomalla* (Esper), 1972, forma S, a TLC method is used. A specimen approximately 2 cm. in length is harvested and placed in a small vial, with a small amount of water if necessary to insure it is wet, and kept closed for 6–24 hrs. About one ml. of methanol is then added and the sample is either shaken for 2 hrs. at about 25° C. or is stored for 16–24 hrs. at about 10° C. A sample of the liquid (10–20 μl.) is spotted on a TLC plate. It is preferred to use a fluorescent-treated silica gel plate, e.g., Uniplate Silica Gel GF (Analtech, Inc., Newark, Del.). As reference standards, spots of $PGA_2$ and $15\beta\text{-}PGA_2$ are also applied. The plate is developed in the A–IX system. The A–IX solvent system used in thin layer chromatography (TLC) is made up from ethyl acetate-acetic acid-2,2,4-trimethylpentane-water (90:20:50:100) according to M. Hamberg and B. Samuelsson, J. Biol. Chem. 241, 257 (1966). The spots are finally visualized with vanillin phosphoric acid spray (McAleer, Arch. Biochem. Biophys. 66, 120 (1957)). Comparison of the unknown with the two reference spots is then made and the identity of the coral established (forma S correspoding to $PGA_2$, forma R to $15\beta\text{-}PGA_2$).

EXAMPLE 1.—ENZYME COMPOSITION

Freshly harvested colony pieces of *Plexaura homonalla* (Esper), 1792, forma S (10 kg.), are chopped into pieces less than 3 mm. in their longest dimension, and then covered with about three volumes (20 l.) of acetone. The mixture is stirred at about 25° C. for about one hour. The solids are separated by filtration, washed with 1–2 liters of acetone, air dried, and finally stored at about −20° C. as a coarse enzymatic powder.

EXAMPLE 2.—ENZYME COMPOSITION

Following the procedure of Example 1, but replacing *Plexaura homomalla* (Esper), 1792, forma S with *Plexaura homomalla* (Esper), 1792, forma R, there is obtained an enzymatic composition.

EXAMPLE 3.—ENZYME COMPOSITION

Colonies of *Plexaura homomalla* (Esper), 1792, forma S (10 kg.) are chopped into pieces, each weighing less than about 2 grams. The chopped material, wet with water, is stored in closed containers for about 24 hrs. at 25° C. and then stirred with about three volumes (30 l.) of acetone at about 25° C. for one hour. The solids are separated by filtration, washed with 1–2 liters of acetone, and air dried, to yield an enzymatic composition.

EXAMPLE 4.—ENZYME COMPOSITION

Following the procedure of Example 3, but replacing *Plexaura homomalla* (Esper), 1792, forma S with *Plexaura homomalla* (Esper), 1792, forma R, there is obtained an enzymatic composition.

EXAMPLE 5.—$PGE_1$

A suspension of esterase composition from *Plexaura homomalla* (Example 1, 2.5 g.) in 25 ml. of water is combined with a solution of $PGE_1$, methyl ester (U.S. Pat. 3,069,322, 0.5 g.) in about 0.8 ml. of ethanol. The mixture is stirred at about 25° C. for 24 hrs. Then, 50 ml. of acetone is added, the mixture is stirred briefly and filtered, and the filtrate is concentrated under reduced pressure. The aqueous residue is acidified to pH 3.5 with citric acid and extracted with dichloromethane. The combined extracts are concentrated under reduced pressure to the title compound; M.P. 115–117° C.

Following the procedure of Example 5 but replacing $PGE_1$, methyl ester with each of the following esters $PGE_1$, ethyl ester
$PGA_1$ methyl ester
$PGE_3$, methyl ester
$PGA_3$, methyl ester
13,14-dihydro-$PGE_1$, ethyl ester
13,14-dihydro-$PGA_1$, methyl ester
15-methyl-$PGE_1$, methyl ester
15-methyl-$PGA_1$, ethyl ester
15-methyl-$PGE_2$, methyl ester
15-methyl-$PGA_2$, methyl ester
15-ethyl-$PGE_3$, ethyl ester
15-methyl-$PGA_3$, methyl ester
13,14-dihydro-15-ethyl-$PGE_1$, ethyl ester
13,14-dihydro-15-methyl-$PGA_1$, methyl ester
$15\beta\text{-}PGE_1$, methyl ester
$15\beta\text{-}PGA_1$, ethyl ester
$15\beta\text{-}PGE_3$, ethyl ester
$15\beta\text{-}PGA_3$, methyl ester
13,14-dihydro-$15\beta\text{-}PGE_1$, methyl ester
13,14-dihydro-$15\beta\text{-}PGA_1$, ethyl ester
15-ethyl-$15\beta\text{-}PGE_1$, methyl ester
15-methyl-$15\beta\text{-}PGA_1$, methyl ester
15-ethyl-$15\beta\text{-}PGE_2$, ethyl ester
15-methyl-$15\beta\text{-}PGA_2$, methyl ester
15-methyl-$15\beta\text{-}PGE_3$, methyl ester
15-methyl-$15\beta\text{-}PGA_3$, ethyl ester
13,14-dihydro-15-methyl-$15\beta\text{-}PGE_1$, methyl ester, and
13,14-dihydro-15-methyl-$15\beta\text{-}PGA_1$, ethyl ester, there is obtained the corresponding prostaglandin-type acid, namely $PGE_1$
$PGA_1$
$PGE_3$
$PGA_3$
13,14-dihydro-$PGE_1$
13,14-dihydro-$PGA_1$
15-methyl-$PGE_1$
15-methyl-$PGA_1$
15-methyl-$PGE_2$
15-methyl-$PGA_2$
15-ethyl-$PGE_3$
15-methyl-$PGA_3$
13,14-dihydro-15-ethyl-$PGE_1$
13,14-dihydro-15-methyl-$PGA_1$
$15\beta\text{-}PGE_1$
$15\beta\text{-}PGA_1$
$15\beta\text{-}PGE_3$
$15\beta\text{-}PGA_3$
13,14-dihydro-$15\beta\text{-}PGE_1$
13,14-dihydro-$15\beta\text{-}PGA_1$
15-ethyl-$15\beta\text{-}PGE_1$
15-methyl-$15\beta\text{-}PGA_1$
15-ethyl-$15\beta\text{-}PGE_2$
15-methyl-$15\beta\text{-}PGA_2$
15-methyl-$15\beta\text{-}PGE_3$
15-methyl-$15\beta\text{-}PGA_3$
13,14-dihydro-15-methyl-$15\beta\text{-}PGE_1$ and
13,14-dihydro-15-methyl-$15\beta\text{-}PGA_1$ Following the procedure of Example 5, but replacing $PGE_1$, methyl ester with $dl\text{-}PGE_1$, methyl ester and with the racemic form of each of the above-listed esters, there is obtained the corresponding racemic acid.

Likewise following the procedure of Example 5, but replacing the esterase composition of Example 1 with each of those of Examples 2–4, inclusive, there is obtained $PGE_1$ in each case.

What is claimed is:
1. A process for producing an esterase enzyme composition comprising the steps:
(1) extracting colonies or colony pieces of the marine invertebrate *Plexaura homomalla* (Esper), 1792 forma R or forma S, with liquid acetone for a sufficient time to remove substantially all soluble lipids, and
(2) recovering the acetone-insoluble matter as said composition.
2. A process according to claim 1 wherein the marine invertebrate is *Plexaura homomalla* (Esper), 1792, forma R.
3. A process according to claim 1 wherein the marine invertebrate is *Plexaura homomalla* (Esper), 1792, forma S.
4. The esterase enzyme composition produced according to the process of claim 1.

References Cited

Adler et al.: The Journal of Biological Chemistry, vol. 236, No. 2, pp. 3240–3245, December 1961.

ALVIN E. TANENHOLTZ, Primary Examiner

U.S. Cl. X.R.

195—30, 66

UNITED STATES PATENT OFFICE
CERTIFICATE OF CORRECTION

Patent No. 3,761,356      Dated September 25, 1973

Inventor(s) Daniels, Edward G.

It is certified that error appears in the above-identified patent and that said Letters Patent are hereby corrected as shown below:

Column 1, line 43, "(I)" should read --(II)--. Column 2, line 26, "is further" should read --is a further--. Column 3, line 43, "actone" should read --acetone--. Column 5, line 8, "Plevaura" should read --Plexaura--. Column 5, line 9 "1972" should read --1792--.

Signed and sealed this 16th day of April 1974.

(SEAL)
Attest:

EDWARD M.FLETCHER,JR.
Attesting Officer

C. MARSHALL DANN
Commissioner of Patents